(No Model.)
A. ROBINSON.
HORSE POWER.
No. 293,087. Patented Feb. 5, 1884.
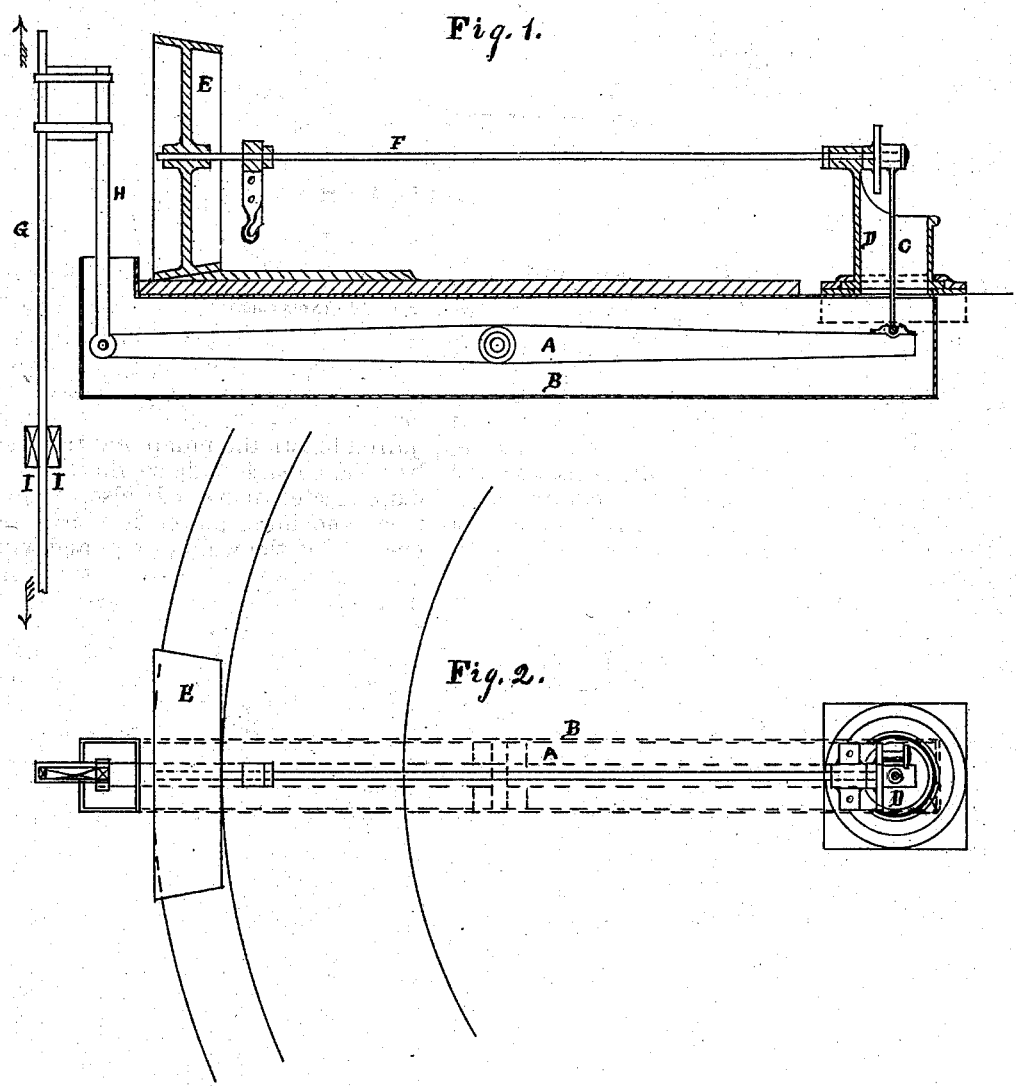
Witnesses.
Chr. E. Gerlach.
H. A. Munson.
Inventor.
Alexander Robinson
per. G. L. Pierce
Atty.

UNITED STATES PATENT OFFICE.

ALEXANDER ROBINSON, OF BENICIA, ASSIGNOR TO BAKER & HAMILTON, OF SAN FRANCISCO, CALIFORNIA.

HORSE-POWER.

SPECIFICATION forming part of Letters Patent No. 293,087, dated February 5, 1884.

Application filed November 5, 1883. (No model.)

*To all whom it may concern:*

Be it known that I, ALEXANDER ROBINSON, of Benicia, in the county of Solano and State of California, have invented a certain Improvement in Horse-Powers, of which this, with the accompanying drawings, is a specification.

The object of my invention is to produce a horse-power complete when it leaves the manufacturer, so it can be attached to a pump having a windmill, or otherwise, without extra expense.

Referring to the drawings, Figure 1 is a longitudinal part section, and Fig. 2 a plan.

My improvement consists in placing a working-beam, A, incased in a rough box, B, open at both ends, on the top side. This box is buried in the ground, and takes the place of the samson-post generally in use. By placing the beam below the track it requires to be but one-half the length. The connection C has a ball-and-socket joint, which allows the part D to revolve with the wheel and shaft E and F. The pump-rod G extends downward to the pump and upward to the windmill, and is connected to the pitman H. Whenever it is required to run the pump and there should not be wind enough to do so, the windmill can be disconnected, if desired; also, by this arrangement the horse-power is placed entirely to one side of the well, pump, and windmill.

I represents guide-timbers, which may be placed at any convenient places on the pump-rod.

Having now illustrated and described my invention, what I deem new, and desire to secure by Letters Patent, is—

A horse-power having the box B, and beam A, and pitman H, substantially as and for the purpose described.

ALEXANDER ROBINSON.

Witnesses:
 W. S. DU BOIS,
 MATT. CLARKEN.